United States Patent [19]
Lippi

[11] 3,707,949
[45] Jan. 2, 1973

[54] ADJUSTABLE MOUNTING BRACKET FOR FOWL CAGE MOUNTED WATERING CUPS

[76] Inventor: Dominic M. Lippi, c/o A. R. Wood Manufacturing Co., Box 218, Luverne, Minn. 56156

[22] Filed: July 30, 1970

[21] Appl. No.: 59,469

[52] U.S. Cl. ......................................119/18, 119/75
[51] Int. Cl. ..............................................A01k 39/02
[58] Field of Search........119/18, 61, 63, 72, 72.5, 75

[56] References Cited

UNITED STATES PATENTS

| | | |
|---|---|---|
| 2,696,802 | 12/1954 | Schmidt ................................119/18 |
| 2,514,491 | 7/1950 | Hay et al. ...........................119/72 X |
| 3,492,970 | 2/1970 | Keen et al. ............................119/18 |
| 2,620,770 | 12/1952 | Drake....................................119/18 |

*Primary Examiner*—Hugh R. Chamblee
*Attorney*—Clarence A. O'Brien and Harvey B. Jacobson

[57] ABSTRACT

A water supply tube is fixedly mounted to a cage. A flexible delivery tube is connected at one end thereof to the supply tube and is connected at the other end thereof to a watering cup that is adjustable as to its vertical height with respect to the cage floor.

8 Claims, 7 Drawing Figures

PATENTED JAN 2 1973 3,707,949
SHEET 1 OF 2
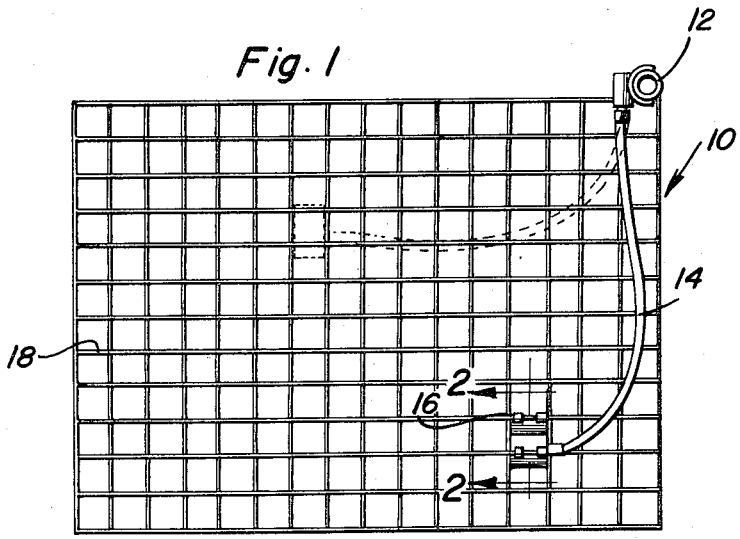
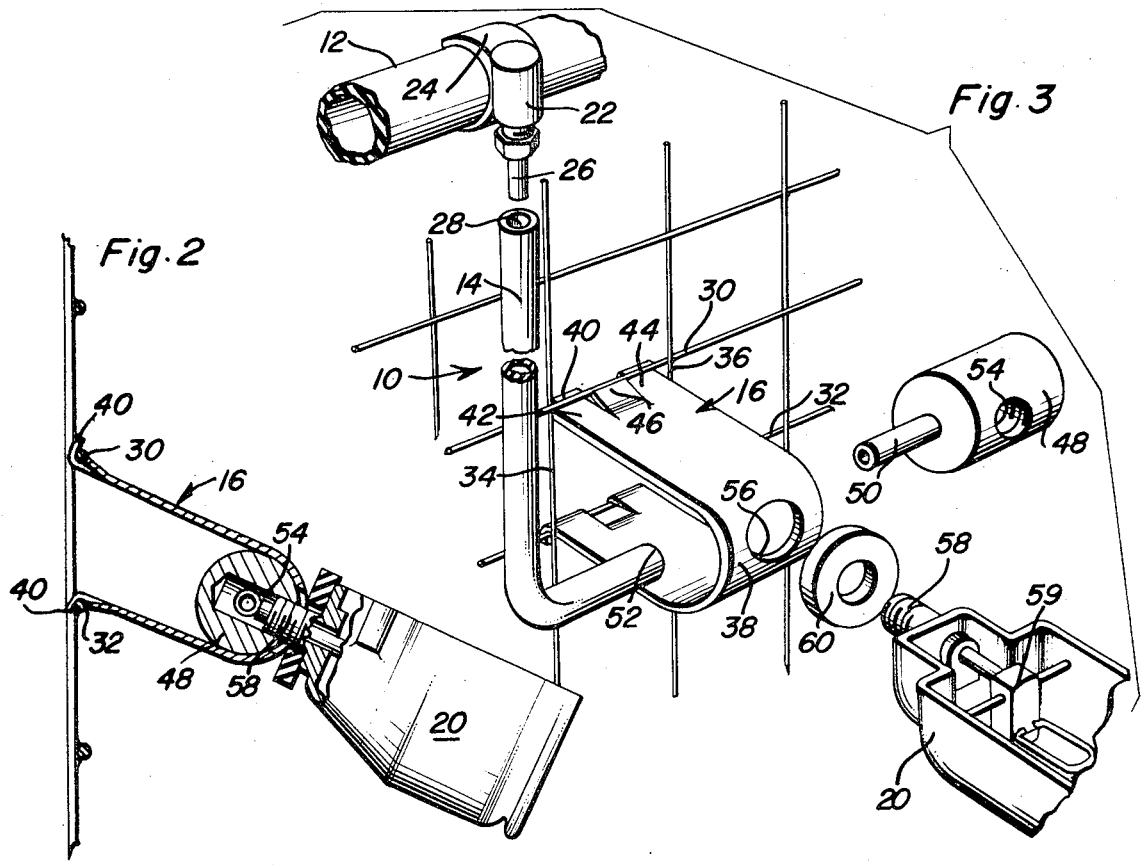
Dominic M. Lippi
INVENTOR.
BY Clarence A. O'Brien
and Harvey B. Jacobson
Attorneys

PATENTED JAN 2 1973　　　　3,707,949

Dominic M. Lippi
INVENTOR

BY Clarence A. O'Brien
and Harvey B. Jacobson
Attorneys

ADJUSTABLE MOUNTING BRACKET FOR FOWL CAGE MOUNTED WATERING CUPS

The present invention relates to an adjustable mounting bracket for allowing the height of a fowl cage watering cup to be varied.

At the present time, several drinking water systems for caged fowl are in use. Generally, the heart of the systems include a watering cup that has a trigger actuated valve for causing the cup to be filled upon demand when the trigger is urged by the beak of a fowl. This type of watering cup is disclosed in U.S. Pat. No. 3,353,518 issued to Hart on Nov. 21, 1967. The disclosed water cup has been adapted for adjustable positioning by utilizing mounting brackets that are clamped to a cage by means of fasteners requiring special tools.

The present invention is intended as an improvement over the present watering systems such as the type disclosed in the aforementioned patent. Particularly, the present invention is directed to a simply adjusted mounting bracket that secures a watering cup at a preselected height with reference to the floor of a fowl cage.

When a cage is inhabited by chicks, the present mounting bracket is positioned at a low level thereby permitting the chicks to feed comfortably. As the chicks grow in size, the mounting bracket is simply repositioned without the use of tools. By fabricating the mounting bracket from a resilient material which clampingly engages the wires of a cage, the bracket can be removed and repositioned horizontally and vertically by merely exerting digital pressure on the bracket. Utilization of a flexible delivery tube between a water supply tube, fixed to the cage, and the watering cup assures continued flow of water to the watering cup without repositioning the supply tube. Accordingly, the present device results in a saving in time and therefore expense when it becomes necessary to vary or adjust the position of watering cups in fowl cages.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a elevational view illustrating the disposition of an adjustable mounting bracket on a stationary cage. The water supply and delivery tubes are illustrated in relation to the bracket and the cage.

FIG. 2 is a sectional view taken along a plane passing through section line 2—2 of FIG. 1 specifically showing the components of a first form of mounting bracket.

FIG. 3 is an exploded view in detail which illustrates the various components of a first form of the mounting bracket.

Figure 4:
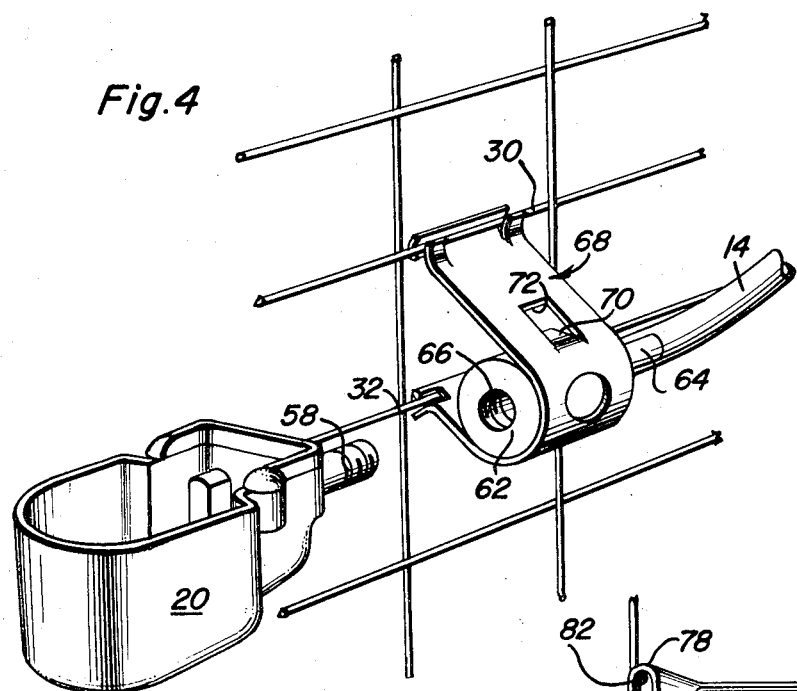
FIG. 4 is a perspective view illustrating a modified version of the first form of the invention.

Referring to the figures and more particularly FIG. 1, a conduit system for supplying an adjustably mounted watering cup with water is generally indicated by reference numeral 10. The system includes a supply pipe 12 communicating with a delivery pipe 14. The supply pipe 10 is fixedly mounted to an upper point on a fowl cage while the delivery tube 14 is constructed from a suitable flexible material. The lower end of tube 14 is connected to a watering cup which in turn is mounted to a bracket 16 that is removably oriented at a vertical and horizontal position along a side of the wire mesh cage 18. As will be noted, all the components of the present invention are positioned on one side of the cage wall as opposed to having the flexible hose 14 going through the cage wall which would require additional openings or slots to permit the repositioning of the adjustable mounting bracket 16. In other words, in the present invention, the watering cup can be freely repositioned entirely to one side of a wall of cage 18 without restrictions within a radius governed by the length of the hose 14.

Referring to FIG. 3 the watering cup illustrated is of the form presently marketed by the Hart Manufacturing Co. and disclosed in U.S. Pat. No. 3,353,518. Therefore, the structure of the watering cup per se is not dealt with in detail herein. However, it should be emphasized that the invention is not limited to this particular cup. Others of similar design and function may be equally suitable.

The supply tube 12 mounts a fitting 22 by means of an arcuate connector 24 that is bonded to the supply tube. The fitting includes a nipple 26 which is inserted in the upper end 28 of the delivery tube 14. Thus, water flowing through the supply tube is delivered to the watering cup 20 by the delivery tube 14.

In the first embodiment of the present invention, the particular mounting bracket 16 is to be vertically positioned between horizontally disposed parallel cage wires 30 and 32. The mounting bracket is laterally bounded by vertical cage wires 34 and 36. As clearly illustrated in FIG. 3, the mounting bracket includes a generally U-shaped member having parallel spaced arms connected to a central bight portion 38. The outward ends of the bracket are fluted as indicated by 40. These ends clampingly engaging the horizontal wires 30 and 32. Slits are formed at the outer ends of the bracket thereby forming tri-furcated ends respectively including three resilient fingers 42, 44 and 46. At each fluted end the outer fingers 42 and 44 underlie the horizontally disposed wires 30 and 32 while the central resilient finger 46 overlies the associated horizontal wire thereby clamping the bracket in position. The bracket is preferably fabricated from spring metal which normally biases the bracket arms laterally outwardly into clamping engagement with the horizontal wires 30 and 32.

A cylindrical adapter 48 is embraced by the mounting bracket 16. More particularly, the adapter includes a central body that appends to a nipple 50, the latter frictionally engaging the lower end 52 of the delivery tube 14. Nipple 50 serves as an inlet to the adapter 48. A threaded outlet 54 is formed in the cylindrical periphery of adapter 48. This threaded outlet 54 receives the threaded fitting 58 of the aforementioned conventional watering cup 20.

Accordingly, when a fowl depresses the cup trigger 59, water is caused to flow through the conduit path including supply tube 12, delivery tube 14, adapter 48, and finally watering cup 20. An opening 56 is formed in the bight portion 38 of the bracket 16 to allow passage of threaded fitting 58 therethrough and into threaded engagement with the adapter inlet 54. A washer 60 is sandwiched between the outer bight portion surface and a confronting face of the watering cup 20. The disposition of the laterally mentioned components is clearly shown in FIG. 2. As will be noted in FIG. 2, the upper arm of the bracket is longer in length than the lower arm so that when the bracket is positioned on cage 18, the bracket slopes downwardly at an angle typically ranging between 10° and 45°. Thus, the watering cup 20 is tilted downwardly to facilitate access by a fowl to the interior of the watering cup 20.

A modified version of the first embodiment is illustrated in FIG. 4. The purpose of this second version is to mount the watering cup 20 against the cage wires as opposed to extending outwardly as shown in FIGS. 2 and 3. The modified version includes an adapter 62 which is cylindrical in form as was the aforementioned adapter 48, the adapter 62 is embracingly engaged by a modified bracket 68 that substantially resembles the aforementioned bracket 16. As far as adapter 62 is concerned, it includes a nipple 64 serving the same purpose as the aforementioned nipple 50 (adapter 48) and instead of the threaded outlet 54 being formed in the cylindrical periphery of the adapter, a threaded outlet 66 is formed in the transverse end opposite the end from which nipple 64 extends. Thus, outlet 66 is capable of receiving the fitting 58 of watering cup 20 so that the watering cup is disposed against the cage as opposed to extending outwardly therefrom.

Tabular elements 70 are cut from the arm portions of bracket 68. These tabular elements are turned inwardly to engage the periphery of adapter 62. This leaves a U-shaped slot 72 in each arm of the bracket 68. The tabular elements serve to supplement the engagement of adapter 62 by the bracket 68 and may also be employed in the device as shown in FIGS. 1–3.

In either the first mentioned version of FIGS. 1–3 or the second illustrated version of FIG. 4, the respective bracket 16 or 68 is easily removed by urging the arms of the bracket inwardly thereby releasing engagement between the bracket and the engaged horizontal cage wires. Then, if the bracket is to be repositioned at another point, the outward ends of the arms are slipped into engagement with vertically adjacent cage wires at the newly selected point and digital pressure is released thereby causing the outward arms to spring outwardly to obtain securement to the cage wires.

Figure 6:
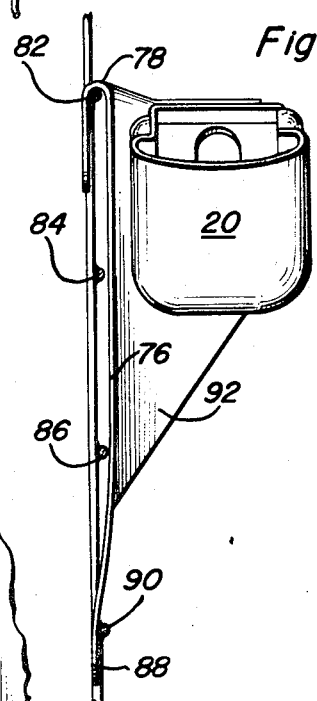
FIG. 6 is a sectional view taken along a plane passing through section line 6—6 in FIG. 5.
Figure 5:
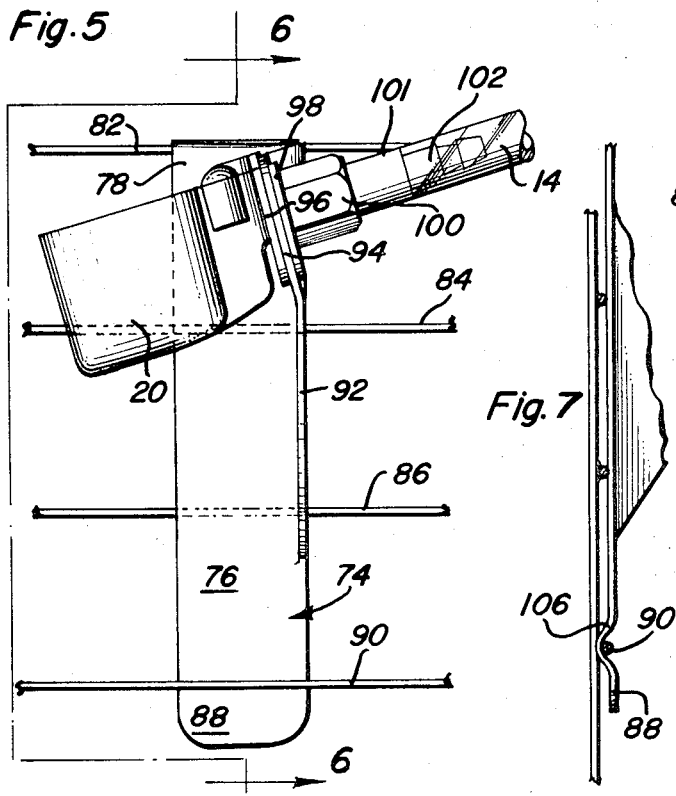
FIG. 5 is an elevational view of a second form of the present invention in which the mounting bracket is of a different shape than that of the first form.
Figure 7:
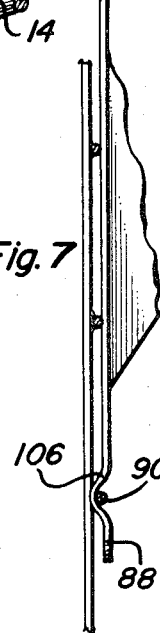
FIG. 7 is a modified version of the second form of the invention.

The second basic form of the present invention is illustrated in FIGS. 5–7. As will be noted, rather than a generally U-shaped bracket, an angle bracket 74 fabricated from a resilient material is utilized. The bracket 74 includes a resilient blade portion 76 that extends to an upper rolled end 28 that engages a horizontal cage wire 82. The back side of blade portion 76 overlies adjacently situated horizontal cage wires 84 and 86. However, the bottom end portion 88 of the blade portion 76 is deflected into underlying engagement with the lower disposed wire 90. Thus, by slipping the blade portion 76 into underlying engagement with cage wire 90 and into engagement with the upper disposed cage wire 82, the blade portion is flexed into clamping relation with the contacted cage wires thereby securing the brackets 74 thereagainst. A right angle flange 92 projects outwardly from the blade portion 76. An outward portion of the angle flange 92 is deformed into offset relation from the plane of the central angle flange 92. An opening is formed in the offset portion 94 which allows passage of watering cup inlet fitting 58 (FIG. 3) therethrough. Washers 96 and 98 sandwich the offset portion 94 and a bolt member 100 of a fitting 101 is connected to fitting 58 (FIG. 3) and clamped against the confronting washer 98. The outward end of the fitting is indicated by 102 and serves to attach the lower end of delivery tube 14. As will be noted in FIG. 5, the offset portion 94 is positioned at an angle which results in the downward tilting of the watering cup at an angle typically ranging between 5°–45 facilitating access to the interior of the water cup by fowl.

A modified version of the basic form illustrated in FIGS. 5 and 6 is shown in FIG. 7. In this figure, the lower end portion 88 of the blade portion 76 is shown to include a horizontal groove 106 for engaging the lower cage wire 90 therein. The groove 106 and wire 90 serve as detent means for securing the bracket 74 in position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An adjustable mounting bracket for a watering cup, the bracket being removably positioned at a selected point on a wire mesh cage, the bracket comprising main body portion means adapted to be connected directly to the cup for supporting the cup entirely to one side of a wall of the cage, and end portion means for releasably engaging wires of the cage for adjustably fixing the position of the bracket, said bracket being deformed into a generally U-shaped spring member having resilient arms extending outwardly to resilient fingers, and further wherein an adapter is employed to connect the cup to a delivery tube, the arms and bight portion of the bracket embracing the adapter for effecting cup support while the fingers engage separate cage wires to fix the position of the member.

2. The structure of claim 1 together with tabular elements projecting from the arm portions of the bracket in confronting relation to each other for supplementing bracket embrace of the adapter.

3. An adjustable mounting bracket for a watering cup, the bracket being removably positioned at a selected point on a wire mesh cage, the bracket comprising main body portion means adapted to be connected directly to the cup for supporting the cup entirely to one side of a wall of the cage, and end portion means for releasably engaging wires of the cage for adjustably fixing the position of the bracket, said bracket being characterized as a resilient angle bracket having a blade portion with a first end thereof looped around a first wire section and a second end thereof biased against another wire section, the bracket further having a flange attached to the blade portion and provided with an opening for securely receiving the cup.

4. The structure of claim 3 wherein the range is angularly offset to tilt the cup downwardly thereby facilitating animal access to the cup.

5. An adjustable mounting bracket for a watering cup, the bracket being removably positioned at a selected point on a cage, the bracket comprising a main body portion for supporting the cup, and end portions for releasably engaging wire sections of the cage thereby adjustably fixing the position of the bracket, the bracket deformed into a generally U-shaped spring member having resilient arms extending outwardly to resilient fingers, and an adapter employed to connect the cup to a delivery tube, the arms and bight portion of the bracket embracing the adapter for effecting cup support while the fingers engage the cage wires to fix the position of the member.

6. The structure of claim 5 together with tabular elements projecting from the arm portions of the bracket in confronting relation to each other for supplementing bracket embrace of the adapter.

7. An adjustable mounting bracket for a watering cup, the bracket being removably positioned at a selected point on a cage, the bracket comprising a main body portion for supporting the cup, and end portions for releasably engaging wire sections of the cage thereby adjustably fixing the position of the bracket, the bracket characterized as a resilient angle bracket having a blade portion with a first end thereof looped around a first wire section and a second end thereof biased against another wire section, the bracket further having a flange attached to the blade portion and provided with an opening for securely receiving the cup.

8. The structure of claim 7 wherein the flange is angularly offset to tilt the cup downwardly thereby facilitating animal access to the cup.

* * * * *